May 12, 1936. B. H. SMITH 2,040,714
FISHERMAN'S LANDING NET
Filed March 12, 1935
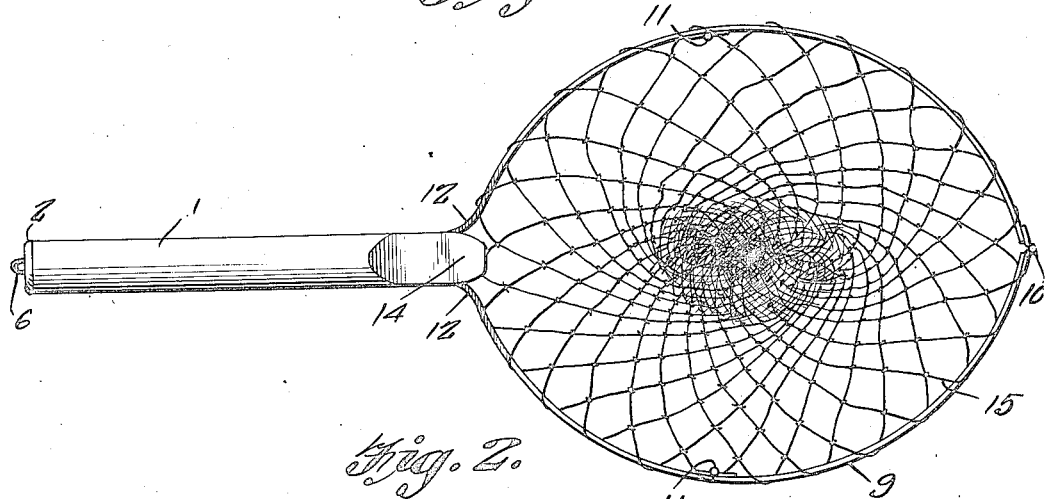
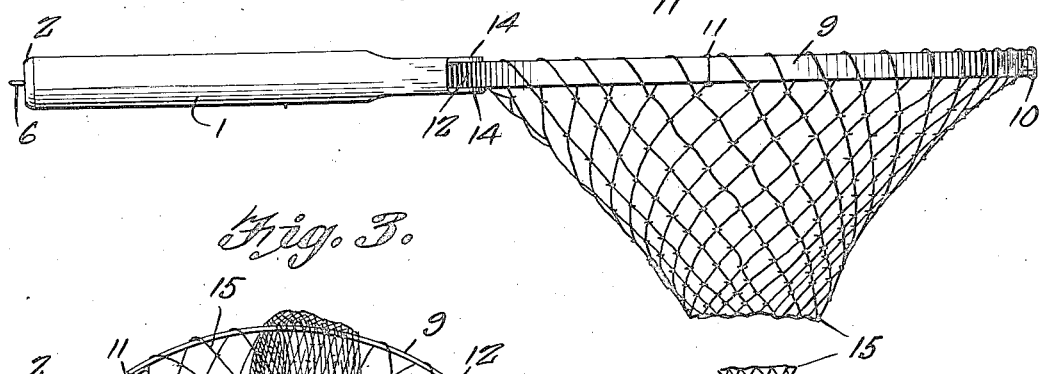
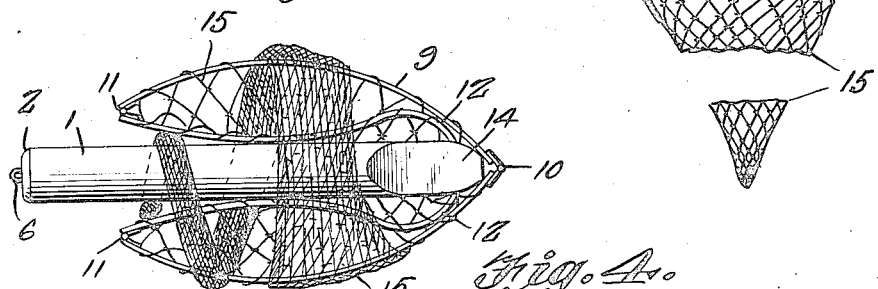
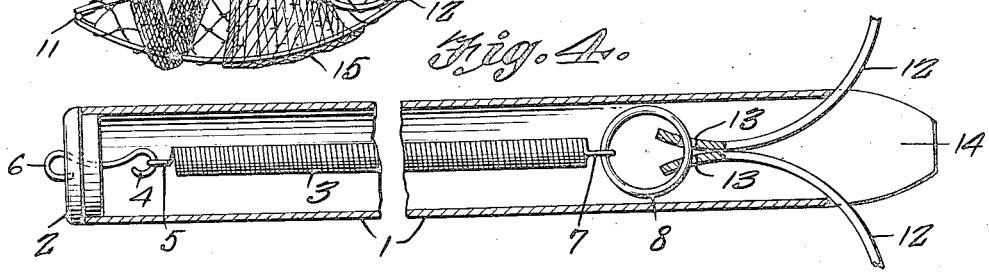
Boyd H. Smith, INVENTOR
BY Victor J. Evans & Co. ATTORNEY
WITNESS:

Patented May 12, 1936

2,040,714

UNITED STATES PATENT OFFICE 2,040,714

FISHERMAN'S LANDING NET

Boyd H. Smith, Berwick, Pa.

Application March 12, 1935, Serial No. 10,739

1 Claim. (Cl. 43—12)

This invention has for its object the provision of a landing net which may be collapsed into a small compass for storage or transportation and which may be instantly expanded when its use is desired. One embodiment of the invention is illustrated in the accompanying drawing and will be fully described, the novel features being particularly defined in the appended claim.

In the drawing:

Figure 1 is a plan view of the landing net expanded for use.

Figure 2 is a side view of the same.

Figure 3 is a plan view, showing the net collapsed.

Figure 4 is an enlarged longitudinal section through the handle.

According to the present invention, the handle is a tube 1 of any suitable material having one end closed by a plug or cap 2, a retractile spring 3 being housed in the handle and having one end anchored to the plug or cap. As shown in Figure 4, the anchoring means is a hook 4 secured in the plug and in an eye or loop 5 formed on the adjacent end of the spring, and the shank of the hook may be extended entirely through the plug and terminate in an eye 6 whereby the net may be hung upon any convenient support for drying, but any preferred form of anchor may be used. The opposite end of the spring is formed into or provided with a loop or eye 7 carrying a ring 8, as clearly shown in Figure 4. The rim 9 is of arcuate metal straps or sections, two of the sections, which may be termed the outer sections, being connected by an external hinge 10 whereby they may be extended into alined relation beyond the handle as shown in Figures 1 and 2, or may be swung toward the sides of the handle as shown in Figure 3. There are also two inner sections, each connected at its outer end with an end of one of the outer sections by an internal hinge 11 whereby they may be folded between the sides of the handle and the respective outer sections, as shown in Figure 3, or may be swung out beyond the handle to open the net, as shown in Figure 1. The inner end portions of the inner section are formed into reversely curved extensions 12 which are fitted in the open end of the handle and are provided at or near their extremities with openings 13 through which the ring 8 is threaded, the extensions riding on the end of the handle which is formed with upper and lower tongues 14 to guide and support the extensions. The net 15 is of the usual knitted or knotted mesh formation with its edge portion wrapped about and secured to the rim in the usual manner.

When the net is not in use, the rim is folded close to the sides of the handle and the body of the net is wrapped around the rim and the handle, as shown in Figure 3, so that the rim will be held in the collapsed condition. When the rim is collapsed, the extensions 12 are drawn out to the end of the handle and the spring 3 is extended and placed under increased tension. Therefore, when the device is to be used, it is necessary merely to unwrap the net from the folded rim whereupon the spring will at once retract, pulling the extensions 12 into the handle and causing the rim to unfold and assume the operative form shown in Figure 1. The opening of the net is entirely automatic, and when collapsed it may be easily stowed with the fisherman's other paraphernalia whereas the bulk and form of the ordinary net necessitate its being carried separately.

Having described my invention, what I claim is:

A fisherman's landing net comprising a hollow handle having an open end, a rim consisting of hingedly connected sections, two of the sections having reversely curved end portions extending into and riding across the end of the handle, a ring engaged through said end portions, a retractile spring anchored at one end in the handle and having its opposite end attached to said ring, and a netted body hung on the rim.

BOYD H. SMITH.